Oct. 9, 1962          L. I. KAPLAN          3,057,767
METHOD OF MAKING COMPRESSOR BLADES
Filed April 1, 1958          2 Sheets-Sheet 1
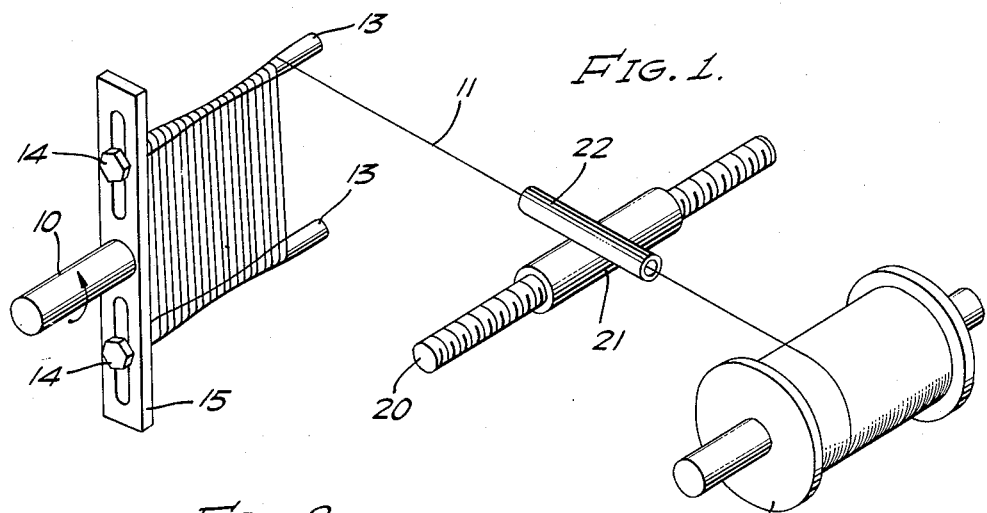
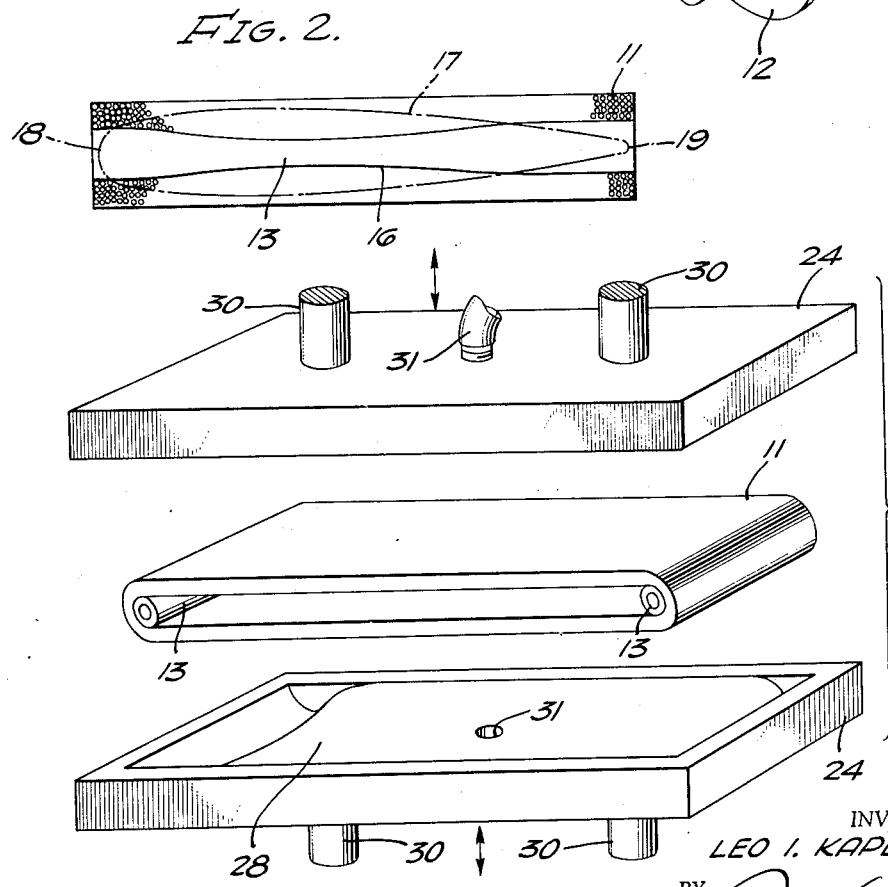
INVENTOR.
LEO I. KAPLAN
BY
ATTORNEYS

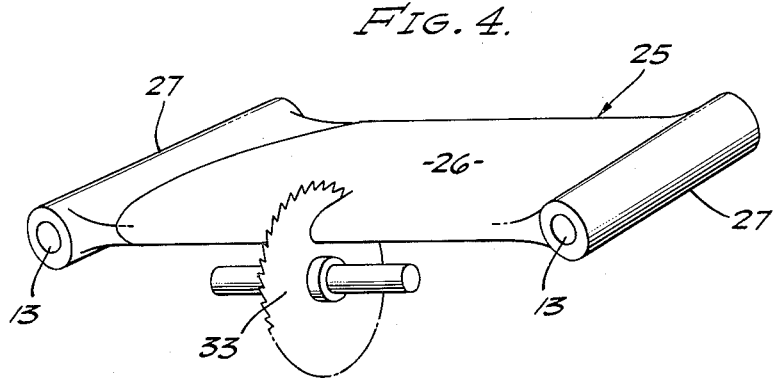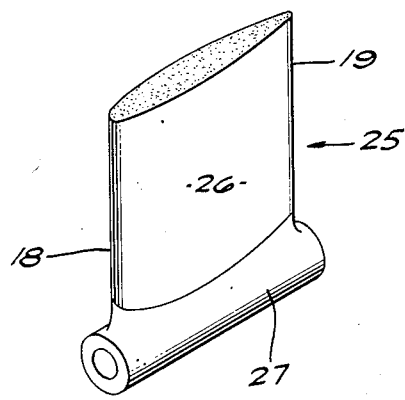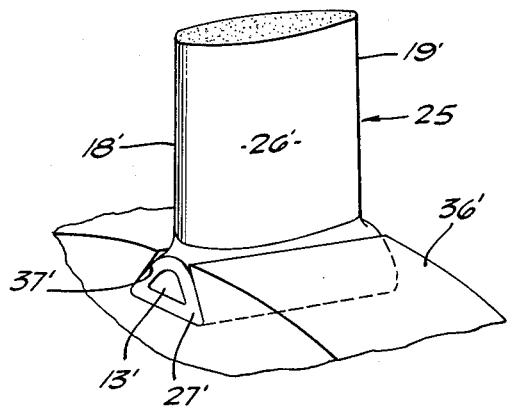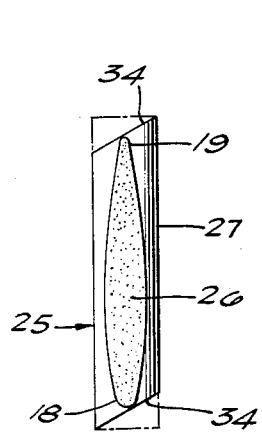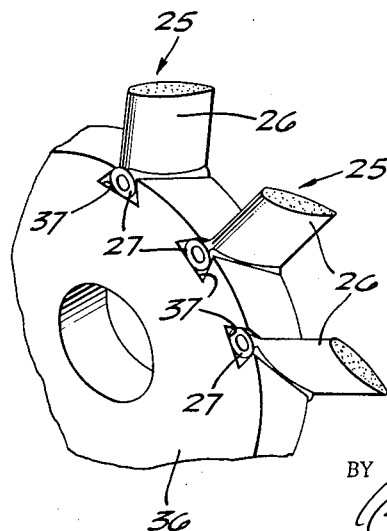

3,057,767
Patented Oct. 9, 1962

1

3,057,767
METHOD OF MAKING COMPRESSOR BLADES
Leo I. Kaplan, Sunland, Calif., assignor to Poly Industries, Inc., a corporation of California
Filed Apr. 1, 1958, Ser. No. 725,533
4 Claims. (Cl. 156—172)

This invention relates to compressor blades and more particularly to an improved high-strength light blade structure and to a unique method of fabricating the same.

Free piston type rotary compressors have distinct advantages over reciprocal piston type compressors which are so well known to workers in this field as to require no comment here. The free piston type of compressor makes use of stubby blades mounted radially in the rim of a shaft supported rotor or runner assembly. Such blades have an aerodynamically contoured surface to increase the air flow efficiency and to reduce losses. Due to the high speed of operation normally employed and the centrifugal forces resulting therefrom, serious design problems are encountered which must be taken into consideration in the design of the blade, its root structure and the runner to which the blades are anchored.

The use of metals in the manufacture of the blades involves certain serious disadvantages successfully overcome by the present invention. Although metals have the advantage of providing essential high strength, the cost of shaping the metal in the desired manner and to the required precision as well as the provision of a satisfactory anchorage for the high centrifugal forces resulting from the weight of metal blades is undesirably great. Furthermore, the shaping of the blades and root structure is time consuming. To obviate these serious disadvantages it has been proposed heretofore to substitute lightweight non-metallic material capable of being molded to shape in a single operation, and high strength plastic materials have been suggested as meeting these requirements. Such materials can be molded quickly, accurately and in exact duplicates of one another. However, it has been found in practice that available plastics, in and of themselves, do not have the requisite strength. Attempts to use reinforcing materials have met only with moderate success. For example, it is known that fiber glass filaments have very great strength per unit of volume and weight. Accordingly, it has been proposed to employ fiber glass fabric as a reinforcing material fully embedded in a suitable plastic material. The strength of the resulting blade structure was disappointingly low and the blade life was found to be short and unpredictable owing to the weakening of the individual fibers in the molding press at the point of filament cross-over in the fabric reinforcing.

The present invention seeks to obviate the numerous disadvantages of prior blade structures and methods of forming the same by providing an exceptionally strong blade formed from a composite of high-strength plastic having uniformly distributed therethrough high-strength reinforcing filaments substantially devoid of points of cross-over due to their parallel arrangement to one another. An important feature of the invention relates to an inexpensive high speed method of manufacturing the blades to a high degree of uniformity. Briefly described, the blades are formed by uniformly winding high-strength metal or fiber glass filaments on a special form by a tech-

2 nique avoiding cross-over of any of the fibers and in such manner that the simple mandrels required therefor are retained as an essential part of the blade root structure forming an important part of the finished article and by which the blade can be quickly and rigidly supported in a runner hub. The filaments wound onto the supporting mandrels are distributed thereover such that the major portion of the fibers are confined to the area of maximum blade thickness. Consequently, minimum shifting of the wound filaments is required when inserting the same into the mold required for embedding them in plastic. The blades are preferably made in pairs connected at their tips until severed to provide separate, identical blades.

Accordingly, it is a primary object of the invention to provide an improved lightweight high-strength blade for rotary compressors and a method for making the same quickly and inexpensively.

Another object of the invention is the provision of an improved compressor blade formed of molded plastic reinforced with filaments encircling the root structure and extending longitudinally of the blade.

Another object of the invention is the provision of a composite plastic and fiber glass blade structure having an integral root structure adapted to fit into a complemental slot formed therefor transversely of a runner rim.

Another object of the invention is the provision of an improved method and technique of forming identical compressor blades of a desired surface contour.

Another object of the invention is the provision of a new method of forming reinforced rotor blades in pairs so that the severance of the blades transversely along a median plane forms two identical blades.

Another object of the invention is the provision of a compressor blade forming technique wherein high-strength filaments are wound on a pair of mandrels for embedding in moldable plastic and adapted to be thereafter separated into two identical blades each having a mandrel or core embedded axially of the blade root structure.

These and other more specific objects will appear upon reading the following specification and claims and upon considering in connection therewith the attached drawings to which they relate.

Referring now to the drawings in which a preferred embodiment of the invention is illustrated:

FIGURE 1 is a schematic view showing the essential components used in winding the filament core of the compressor blades according to the present invention;

FIGURE 2 is a transverse sectional view through the reinforcing filaments for the blade before these are placed in the forming molds;

FIGURE 3 is an exploded view of the mold with the wound reinforcing filaments in readiness for insertion thereinto;

FIGURE 4 shows the completed molded product after removal from the mold and in the process of being separated into identical blades;

FIGURE 5 is a perspective view of a blade after severance;

FIGURE 6 is a plan view from the severed end of the blade after the ends of the root have been cut off on the bias;

FIGURE 7 is a fragmentary isometric view of the rotor showing several blades anchored thereto; and FIGURE 8 is a fragmentary perspective view of an alternate preferred construction of blade root.

Referring first to FIGURE 1 there is shown schematically apparatus suitable for winding the reinforcing filaments parallel to one another and free of points of crossover. It will be understood that shaft 10 is arranged to be suitably supported for rotation counterclockwise to wind suitable high-strength filament material 11 from a supply spool 12 thereof onto a pair of suitably contoured rigid cores 13, 13. These cores or mandrels are detachably clamped as by screws 14 to a bracket 15 fixed to the end of shaft 10. It will be understood that the cores 13, 13 may be formed of suitable metal and have a shape such as that indicated in FIGURE 2 to the end that the layers of filament 11 thereon will be distributed in a desirable manner. For this purpose the opposite ends of cores 13 are of larger diameter and taper along slightly different curves toward the smaller diameter midsection 16 of the cores. The dot and dash line 17 indicates generally the cross-sectional shape desired in the completed blade structure relative to the contour of cores 13. The desired cross-sectional shape of an efficient blade is conventionally described as foil shape and includes a relatively thick leading edge 18 and a relatively thin trailing edge 19. By judiciously selecting the shape of cores 13 it will be appreciated that the layers of filament 11 may be so distributed as to assure the uniform distribution of the reinforcing fibers throughout the blade. It will therefore be understood that the shape of cores 13, 13 illustrated in FIGURES 1 and 2 is by way of illustration only and that the core shapes will vary in accordance with the blade design intended being produced.

Aiding in the distribution of filament 11 on cores 13 is a screw 20. Threadedly mounted on screw 20 is a sleeve 21 fixedly supporting a distributor tube 22 at right angles thereto and through which filament 11 extends at a point between spool 12 and cores 13, 13. It is pointed out that screw 20 is arranged to be driven in opposite directions by any suitable drive means at varying rates and in a manner to control the thickness of the winding and the distribution of the filament turns lengthwise of cores 13, 13. Although the layers of filament on the cores appear to be relatively uniform in FIGURE 3, it is pointed out that in actual practice the layers are relatively thicker along one lateral edge of the skein and relatively thin toward the opposite edge as is desirable in forming the relatively thick and thin edges of the blade, respectively.

After a desired quantity of the filament, which may be either high-strength metal or preferably high-strength glass fiber, has been wound, rotation of mandrel 10 is discontinued and screws 14 are removed as the cores 13 are held spaced apart to maintain the runs of the skein under tension and in place on the cores. While so held, the skein assembly is placed within cavity 28 formed within the halves of a two-part mold 24, 24. Cavity 28 has the shape desired in the finished molded product such as that of the finished product illustrated in FIGURE 4, it being understood that the mold product there shown is severable to provide two identical blade structures 25, 25. Each blade 25 includes an air foil shaped section 26 and a suitably shaped hub or root structure 27. It is pointed out that the opposite ends of mold cavity 28 have a length equal to the length of the cores 13, 13 and are preferably contoured to form a cylindrical root structure having a diameter in excess of the thickest portion of the blade.

Handling of the mold halves to and from a suitable heavy duty hydraulic press of conventional type is facilitated by the provision of posts or the like 30, 30, it being understood that these are merely illustrative of means which may be employed for separating and handling the mold halves. In some cases these posts may also be utilized in holding the mold closed under high pressure. Normally, however, it is desirable that pressure be applied evenly across substantially the entire opposed outer surfaces of the mold halves by suitable press-apparatus. It will also be recognized that the molds are heated as the pressure is applied to hasten and aid in carrying out the curing of the particular plastic material employed. The heating means may be built into the mold halves or the heat may be transmitted from the contacting portions of the press into which the mold is placed.

Uncured plastic material in molten or fluent form is introduced into the closed mold cavity in any suitable manner, such as through the supply ducts 31, 31 opening through the opposite faces of the mold halves. Although only two such ducts are shown, any required number may be employed to assure complete and uniform distribution. It is also pointed out that the filament and core assembly may be impregnated with plastic material after being wound on cores 13 and prior to enclosure between the mold halves. Any additional quantity of plastic required to completely fill the mold cavity may be introduced through ducts 31, 31 or the like if necessary. These details of the molding step as well as the purging of entrapped air may be carried out in various ways well known to those skilled in this art, and do not in and of themselves constitute a novel feature of the invention. After the mold has been subjected to heat and pressure at the proper values and for the period or periods required to effect complete curing of the plastic, the pressure and heating are discontinued and the mold is opened to permit withdrawal of the resultant molded product 25.

The next step is the severance of the unitary molded product transversely thereof along a plane parallel to the axes of cores 13, 13 and midway therebetween, an operation conveniently performed by a rotary saw 33. Later the ends of the root structure are cut off on the bias as indicated at 34 so as to lie flush with the opposite side faces of the runner hub 36. This hub, as shown, comprises a thick, high-strength ring having notches 37 cut crosswise of its rim and at an appropriate angle to the hub axis. Preferably notches 37 have converging side walls and are so dimensioned as to receive the root structure with a close frictional fit. Since the mouths of notches 37 are appreciably narrower than the diameter of the blade root structure 27, it will be evident that the same are firmly locked against radial displacement. Additionally the triangularly shaped inner corners of notches 37 are preferably filled with soft metal inserts so shaped as to fill the intervening space fully as the inserts are driven into assembled position from one end face of hub 36. In the alternate construction shown in FIGURE 8 the blade root structure 27' has flaring side walls disposed for a rigid press fit within notches 37'. It will be appreciated that these notches may be formed in the shape shown in FIGURES 7 and 8 or in some other non-circular shape of wider internal width than the entrance thereto.

While the particular molded high-strength lightweight blade structure and method of making the same herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. That improvement in the manufacture of compressor rotor blades which comprises, rigidly supporting shaped cores in a holder rotatable about an axis between and parallel to said cores, rotating said cores about said axis to wind multiple layers of a continuous high-strength filament in a distributed manner therealong, supporting the resultant assembly of filament encircled cores in a rigid mold, filling the mold with uncured fluid plastic, subjecting the filled mold to heat and pressure until said plastic becomes cured, and separating the resultant product transversely of said filaments into identical blades having integral root structures.

2. That improvement defined in claim 1 characterized in holding said layers of filament tensioned while the same are being embedded and molded into plastic and in that the opposite ends of said structures are cut off on the bias with respect to the axes of said cores so that said ends can lie in the plane of the faces of a supporting hub when the blades are assembled therein.

3. That improvement defined in claim 1 characterized in that the filament is wound onto said cores in different thicknesses in one area than in another to the end that the midsection of the resulting blade will have a greater number of reinforcing filaments therein than do the opposite lateral edges of the blade.

4. That improvement defined in claim 1 characterized in that said filament is so distributed on said cores that when the filaments are later placed in a mold and embedded in plastic the filaments will be substantially uniformly dispersed through said plastic.

References Cited in the file of this patent

UNITED STATES PATENTS

| | | |
|---|---|---|
| 1,479,148 | Mastin | Jan. 1, 1924 |
| 1,852,824 | Schroeder | Apr. 5, 1932 |
| 2,689,813 | Lawrence | Sept. 21, 1954 |
| 2,694,661 | Meyer | Nov. 16, 1954 |
| 2,781,962 | Wilder | Feb. 19, 1957 |
| 2,802,619 | Clarke | Aug. 13, 1957 |
| 2,859,936 | Warnken | Nov. 11, 1958 |
| 2,955,348 | Healy | Oct. 11, 1960 |